Dec. 8, 1964  D. E. VIERLING  3,160,630
PROCESS FOR PREPARING PHENOTHIAZINE HAVING A SMALL
PARTICLE SIZE AND COMPOUND RESULTING THEREFROM
Filed April 26, 1961  6 Sheets-Sheet 1

INVENTOR
Donald E. Vierling
by Robert U. Geib, Jr.
ATTORNEY

INVENTOR
Donald E. Vierling
by Robert U. Geib, Jr.
ATTORNEY

Dec. 8, 1964   D. E. VIERLING   3,160,630
PROCESS FOR PREPARING PHENOTHIAZINE HAVING A SMALL
PARTICLE SIZE AND COMPOUND RESULTING THEREFROM
Filed April 26, 1961   6 Sheets-Sheet 4

INVENTOR
Donald E. Vierling
by *Robert U. Geil, Jr.*
ATTORNEY

INVENTOR
Donald E. Vierling
ATTORNEY

United States Patent Office 3,160,630
Patented Dec. 8, 1964

3,160,630
PROCESS FOR PREPARING PHENOTHIAZINE HAVING A SMALL PARTICLE SIZE AND COMPOUND RESULTING THEREFROM
Donald E. Vierling, 4594 Doverdell Drive, Pittsburgh, Pa.
Filed Apr. 26, 1961, Ser. No. 105,802
2 Claims. (Cl. 260—243)

This invention relates to a process for preparing improved phenothiazine, and more particularly to a process for preparing phenothiazine of an extremely fine particle size. This invention also relates to phenothiazine produced by said process.

In the United States Department of Agriculture Bulletin ARS 20–9, of September, 1960, entitled "The Nature and Fate of Chemicals Applied to Soils, Plants and Animals," there appears an article by Foster et al., on page 48, thereof, bearing the title "Use of Chemicals for Control of Parasites of Food Animals," in which the authors state that, in 1954, the Department of Agriculture estimated that internal and external parasites were about equally responsible for losses which exceeded one billion dollars annually at the farm level. The authors went on to state that developments during the intervening six years had indicated that the estimate was conservative. The magnitude of the problem is, therefore, extremely serious and a solution therefor highly desirable.

Phenothiazine has been found to be very effective in the control of internal parasites in livestock animals. Organo phosphates, such as O,O-diethyl-O-(3-chloro-4-methyl-7-courmarinyl)phosphorothionate, 4-tert-butyl-2-chlorophenyl methyl methylphosphoramidate, O-methyl-O - (4-tert-butyl-2-chlorophenyl)ethylphosphophoramidothioate, etc., have also been tested for such purposes. However, they are, in general, more expensive than phenothiazine. More important, organo phosphates are extremely toxic to livestock animals, whereas phenothiazine is essentially non-toxic.

The procedures generally employed in the preparation of phenothiazine are old and well known. Thus, diphenylamine and sulphur are reacted together in approximately stoichiometric amounts; that is, about one mol of diphenylamine with about two mols of sulphur, in the presence of a controlled amount, which can be about two percent by weight of the reactants, of a suitable condensation catalyst, such as aluminum chloride, aluminum bromide, ferric chloride, iodine, copper iodide, etc., at a temperature of about 180° C. to about 200° C., and a pressure of about 14.0 to about 20 pounds per square inch gauge for a time which can be from about one to about eight hours. Hydrogen sulphide gas is given off and a molten mixture comprising mainly phenothiazine and from about two to about ten percent by weight thereof of impurities consisting essentially of analogs of phenothiazine, such as phenothiazine sulfoxide, is obtained.

At this point in the manufacture of phenothiazine, one of two procedures can be followed. The molten mixture, including the impurities, can be passed into cooling pans wherein the mixture is permitted to solidify over a period of about one to four hours. The solidified phenothiazine is very brittle and can be easily broken up by the use of a shovel, hoe, scraper or similar instrument into lumps that are approximately two inches by three inches by one inch thick. The phenothiazine so produced has a purity of about 90 percent and possesses a freezing point of about 179° to about 180° C. Pure phenothiazine has a freezing point of 185.1° C. By "freezing point" I mean to refer to the temperature at which phenothiazine will transfer from its molten to its solid or crystalline stage in accordance with the definition thereof appearing in "The National Formulary," tenth edition, 1955.

Alternatively, the molten mixture defined hereinabove can be purified before it is passed into the cooling pans. A method for doing this is described and claimed in my prior U.S. Patent No. 2,887,482 dated May 19, 1959. Thus, the impure phenothiazine, admixed with about one-half to about 50 percent by weight of silicon dioxide of an average particle size varying from about three and one-half to about 400 mesh or more, is heated to a temperature of at least 300° C. and then subjected to distillation conditions. Silicon dioxide and a substantial proportion of the impurities are left behind. Purified phenothiazine distills over and is passed into cooling pans where it is cooled into blocks and thereafter broken into lumps in the manner previously described. The phenothiazine thus obtained has a purity of about 99.8 percent and a freezing point of about 184.5° to about 184.9° C.

The mode of action of phenothiazine in controlling internal parasites in livestock animals, like many other drugs, including aspirin, is not scientifically known. Thus, it is generally known that, in this context, the greater the purity of phenothiazine, the more effective it becomes, although the reason therefor is not known. It is believed that, when phenothiazine is cooled from the molten mixture described hereinabove, the impurities admixed therewith have a tendency to coat the individual phenothiazine crystal and thus renders the same ineffective.

It is also well known that there exists a direct relationship between the size of the phenothiazine particle and its anthelmintic efficiency. The smaller the particle size, the more effective it becomes as an anthelmintic. This point was well emphasized, for example, in a paper entitled "The Relationship Between Particle Size in Anthelmintic Efficiency of Phenothiazine" by Douglas et al. appearing in American Journal of Veterinary Research, volume 17, No 63, April 1956, pages 318–323. It is therein stated that, although the action of phenothiazine on internal parasites is not clearly understood, evidence would seem to suggest that the drug enters the body of the parasite through the cuticle rather than orally. It would seem logical to assume, then, that, since phenothiazine is relatively insoluble in water, and probably also in digestive contents, its action on the worm is by direct solution from the solid state through the cuticle, similar to the phenomenon observed when many insects are exposed to solid intersecticide particles. Therefore, the smaller the size of the individual phenothiazine particle, the easier it is for the same to enter the cuticle of the parasite.

Another theory which has been advanced for the increased efficiencies obtained from the use of phenothiazine of small particle size is that, by reducing the particle size of the individual phenothiazine particle, more particles per unit weight of phenothiazine are obtained. Recognizing that phenothiazine is a contact drug, and following the laws of probability, it inherently follows that there is a greater chance of a particle of phenothiazine coming in contact with a parasite due to the increased number thereof per unit weight. This, of course, means that the chance of a parasite coming in contact with a phenothiazine particle is very great.

Purification of impure phenothiazine can be effected in a number of ways, including the method described and claimed in my aforementioned U.S. Patent No. 2,887,482. On the other hand, the obtaining of phenothiazine of an extremely small particle size has presented formidable obstacles. Particle size, as defined hereinafter, will refer to the average particle size of phenothiazine as determined on a Fisher Sub-Sieve Sizer made by Fisher Scientific Company of Pittsburgh, Pennsylvania.

When phenothiazine was first manufactured in about 1940, the procedure used in producing phenothiazine of small particle size involved, as an initial step, subjecting the lumps of phenothiazine obtained from the cooling pans to the action of a mechanical crusher provided with revolving blades to obtain pea-size particles of phenothiazine of approximately one-half inch by one-half inch by one-half inch in size. This precrushed phenothiazine was then fed into an ordinary hammer mill wherein it was reduced to an average particle size of approximately 30 microns. While phenothiazine of such size was found to possess fair anthelmintic properties, the efficiency thereof was not as great as with phenothiazine of smaller particle size. The next step was the use of a micro pulverizer (manufactured by Pulverizing Machinery Company, Summit, New Jersey) wherein the particle size of the phenothiazine was further reduced to approximately 15 microns. By using finer screens in this micro pulverizer, adjusting the feed input, and making other refinements, it was found that phenothiazine could be reduced to an average particle size of about six to seven microns. The phenothiazine thus obtained was subjected to the action of a Micro-Atomizer, which is a combination hammer mill and air classification mill; and, by this means, the phenothiazine was reduced to a particle size of about four to five microns. Phenothiazine of the same particle size can also be obtained by using a ball mill; but the economics of a ball mill render its use exceedingly expensive.

The next step involved the use of an air-attrition mill, wherein the material to be micronized was injected into a stream of air or other inert gas at high pressure (125 pounds per square inch) and high volume flow (1600 cubic feet per minute). The flow of inert gas is effective in imparting extremely high velocity to the particle to be micronized; and the particles, upon contact with each other, will fracture into other particles of extremely small size. When the particles have reached a desired size, they are carried off in an air stream and air classified. The fine particles are caught in dust collectors and packaged. A micronizing mill of this type is manufactured by Fluid Energy Processing and Equipment Company of Philadelphia, Pennsylvania. By the employment of this method, phenothiazine has been reduced to a particle size of between two and three microns. Due to the high cost of producing the large flow of high pressure inert gas, however, this method is also extremely expensive. It is practically impossible, moreover, by this method to produce phenothiazine having a particle size of less than about 1.7 microns regardless of time or cost.

Phenothiazine has also been reduced to a particle size of about two to three microns by the wet-milling process. After the phenothiazine has, by any of the methods referred to hereinbefore, been reduced to pea-size, and then to smaller size on the order of approximately 10 microns, it is, in the wet-milling process, mixed with a liquid, such as water and a wetting agent, until the mixture becomes a muddy consistency. This material is then introduced into a ball mill or rod mill and subjected to continuous grinding for a long period of time, for example, about eight hours, until the particle size is reduced to about two to three microns. This procedure, unfortunately, is a very costly and time-consuming operation.

From the foregoing, it is apparent that the art recognizes the desirability of producing phenothiazine of extremely fine particle size, and that great effort and expense have been expended in attempts to obtain it. A process for producing phenothiazine of a particle size as small as, or even smaller than, that produced by any of the procedures now known in the art would obviously be extremely desirable, particularly if the expense thereof is comparatively low.

I have discovered a procedure for obtaining phenothiazine of any desired size, and particularly phenothiazine having an average particle size which is consistently smaller than that which may be obtained by the prior art procedures earlier referred to, and this without the attendant disadvantages of costly machinery and extended times of treatment, etc.

The first step involved in the process of the present invention comprises dissolving, in a liquid solvent, phenothiazine of any size, including phenothiazine as removed from the cooling pans earlier mentioned, and which may be in the form of relatively large lumps. By "solvent" I intend to include liquids, hereinafter referred to for the sake of simplicity as "class I liquids," in which the phenothiazine is soluble, at atmospheric pressure and atmospheric temperature, to the extent of at least about 5 grams of phenothiazine per 1000 grams of said liquid. In addition, the Class I liquid must be one which will not introduce appreciable contaminants into the reaction system of the invention, or which is not adversely reactive with the phenothiazine or other materials which will enter the system. Representative Class I liquids which can effectively be employed include benzene, ethyl alcohol, methyl alcohol, acetic acid, acetone, ether, mineral oils, etc.

Some impurities of the type hereinabove defined may be present in the phenothiazine and will remain when it is dissolved in the Class I liquid defined above, and, therefore, a preferred embodiment of the present invention contemplates the filtering of the solution at this point. The impurities will not dissolve in the Class I liquid, but the phenothiazine will; hence, filtration at this point will remove a substantial portion of the impurities from the solution. This filtration, depending on the amount of impurities present in the phenothiazine dissolved in the Class I liquid, is generally sufficient to increase the purity of the phenothiazine by an amount of about 0.1 to about 7 percent.

The solution obtained above, whether or not passed through a filter, is then poured into a liquid, hereinafter referred to for the sake of simplicity as a "Class II liquid," which is one in which the Class I liquid is miscible and the phenothiazine is substantially insoluble. By "miscible," I mean to refer to a system in which the Class I liquid is miscible in the Class II liquid to the extent of at least about one part, and preferably at least about 50 parts, per hundred parts of the Class II liquid. As with the Class I liquid, the Class II liquid must be one which is not adversely reactive with the phenothiazine or other materials which will enter the reaction system during the herein defined operation or introduce appreciable contaminants thereinto. Representative Class II liquids which can be employed include water, petroleum ether, chloroform, etc., water being preferred.

Merely dissolving phenothiazine in a Class I liquid, and thereafter pouring the solution obtained into a Class II liquid, with nothing more, will not sufficiently guarantee the obtaining of phenothiazine of acceptable particle size. This is shown by reference to FIGURE 1 of the drawings wherein the amount of water employed (Class II liquid) is plotted against particle size. A solution of phenothiazine in a Class I liquid was obtained by dissolving phenothiazine, having a particle size of ¼ inch by ¼ inch by ¼ inch, a purity of 99.8 percent and a melting point of 184.5° C., in 750 cc. of acetone at a temperature of 60° F. This solution was then poured over a period of 5 minutes, or 300 seconds, into a container having a dimension of 8¼ inches inside diameter by 10 inches high and containing a Class II liquid, water. This procedure was repeated several times, each time with the same amount of Class I liquid, but with increasing amounts of water. In each instance, the water was held at a temperature of 60° F. Upon contact with the water, the phenothiazine dissolved in the Class I liquid crystallized out of solution almost instantly, and, being lighter than the liquids associated therewith, floated to the surface thereof. Only after the Class I liquid was completely poured into Class II liquid were the crystals removed from the system, dried and analyzed as to their particle size through the use of a Fisher Sub-Sieve Sizer. It will be noted from the plot in FIGURE 1 that, as the amount of water in which the Class I solution was poured was increased, the particle size of the phenothiazine was appreciably decreased, and this decrease continued until the amount of water employed was about 5000 cc. Regardless of how much additional water was employed, the average particle size of the phenothiazine could not be reduced below 2.5 microns, which is excellent, and certainly as good as the more expensive and time-consuming prior art methods enumerated earlier herein.

Figure 1:
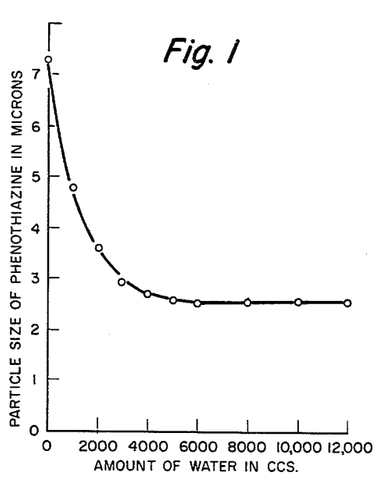

I believe that the phenomenon illustrated by FIGURE 1 can be explained on the basis that there must not only be sufficient Class II liquid present in which the Class I liquid is miscible, but sufficiently additional Class II liquid to permit the crystallization of the phenothiazine out of solution. In FIGURE 1, it is shown that, until about 5000 cc. of water is used, it is not sufficient, in this system, to serve both functions to best advantage. At this point, an equilibrium is reached, however, between crystal formation and further crystal growth. Thus, the volume amount of Class II liquid which must be used relative to the Class I liquid is at least about two to one, peferably at least about three to one, but most desirably at least about five to one.

Figure 2:
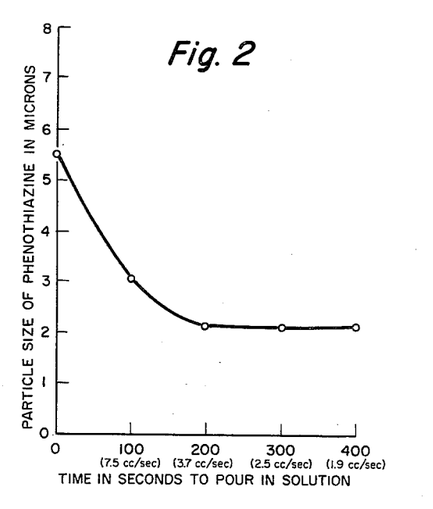

In an effort to determine the effect of the rate of introduction of the Class I solution into the Class II liquid, I have run a series of tests wherein 150 grams of the same phenothiazine employed in FIGURE 1 was dissolved in 750 cc. of acetone; and the solution was poured at varying rates on top of 6000 cc. of water maintained at 60° F. The water was not agitated, nor were the crystals removed, until all of the Class I solution had been poured into the Class II liquid. As illustrated in FIGURE 2, when the Class I solution was dumped practically instantaneously in the Class II liquid, the particle size of the phenothiazine was 5.5 microns. However, when the rate of introduction was reduced to 7.5 cc. of Class I solution per second, the particle size of the phenothiazine was reduced to three microns. When the rate of introduction was further reduced to 3.75 cc. of Class I solution per second, the particle size of phenothiazine was reduced to 2.1 microns. A further reduction in the rate of introduction of the Class I solution in the Class II liquid did not further reduce the particle size of the phenothiazine obtained.

Accordingly, it can be seen from FIGURE 2 that the particle size of the phenothiazine crystal will be dependent upon the rate of introduction of the Class I solution into the Class II liquid. The rate of introduction, therefore, must be such that there is substantially continuous and complete contact between the Class I solution and Class II liquid. By increasing the number of points of introduction, the amount of Class I solution introduced into the Class II liquid per unit of time can be correspondingly increased. For example, a sparger placed inside the tank holding the Class II liquid may be employed to increase the rate of introduction thereinto of the Class I solution.

Although the results obtained by the examples set forth were quite satisfactory, it was found that they could be further improved by maintaining the temperature of the Class II liquid within certain critical limits. This is illustrated in the data employed in the construction of the graph illustrated in FIGURE 3. As before, 150 grams of phenothiazine were dissolved in 750 cc. of acetone. In each run, the amount of water in which the Class I solution was poured was maintained at 6000 cc. The temperature of the water was varied throughout the runs. The acetone solution was poured on the water at a rate of 2 cc. per second. The phenothiazine particles were recovered as previously. The results obtained are plotted in FIGURE 3. When the temperature of the water was maintained at a high level, the average particle size of phenothiazine was relatively large. When the water was maintained at 75° F., the particle size was reduced to 2.3 microns; at 33° F., it was further reduced in size to 2.1 microns. Desirably, therefore, the temperature of the Class II liquid is maintained throughout the operation in the range of about 33° to about 75° F. In the event a higher particle size phenothiazine may be acceptable, the temperature of the Class II agent can be maintained as high as 100° F., or even as high as 150° F.

As noted, it is highly desirable, in order to facilitate the precipitation of phenothiazine out of solution, that the Class I solution be in continuous contact with a Class II liquid. It has been seen that such contact can be facilitated by employing a large amount of a Class II liquid relative to the Class I liquids. I have found that such contact can be additionally facilitated by continuously agitating the Class II liquid while the Class I liquid is being poured therein. Any convenient method of agitation may be employed as long as almost instantaneous mixing of the two liquids is obtained.

Experimentally, I have found variable speed agitators having speeds from 85 to 2500 r.p.m.'s to be satisfactory for the mixing contemplated by the present invention. Maximum agitation can be obtained using a wide range of stirrers, including propeller-type stirrers, umbrella stirrers (manufactured by Fisher Scientific Company) and paint stirrers. By "paint stirrer" is meant a disc provided with knife blades at various angles which are effective in producing all types of shearing and mixing action. Paint type stirrers agitated at speeds of approximately 1750 r.p.m. are extremely effective for this purpose. By "agitation" I mean to refer to any violent action of suction, impact, jetting, shearing and dispersion which is rapidly repeated, time after time, sufficient to provide an extremely fast and thorough mixing cycle. An apparatus which is extremely effective in obtaining the desired agitation is described in Bulletin 1059 of the J. H. Day Company, Cincinnati, Ohio.

In short, effective mixing in this context is achieved by obtaining almost instantaneous blending or dispersion of the Class I solution through a large volume of the Class II liquid. High recirculation rate of the entire mixture per unit time must be maintained. At least one point of very high shear must be present. A violent scrubbing effect must be obtained with high velocities over the tank walls and tank bottom.

Figure 4:
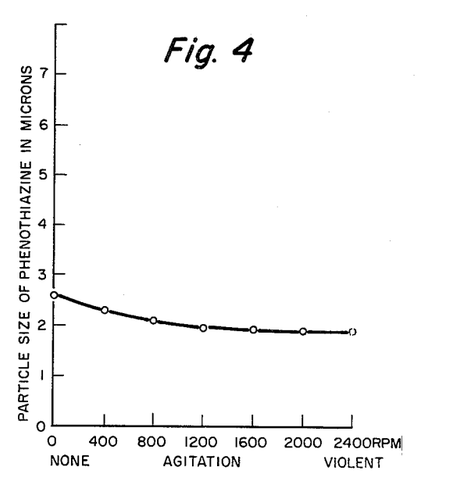

The desirability of obtaining almost instantaneous mixing is illustrated in FIGURE 4. Again, 150 grams of the same phenothiazine previously employed was dissolved in 750 cc. of acetone, and the solution obtained was poured at a rate of 2 cc. per second into 6000 cc. of water in the container previously described maintained at 60° F. The phenothiazine which crystallized out of solution was removed as before. A variable speed agitator provided with a paint type agitating blade was employed in the several runs. The data plotted in FIGURE 4 show that, with increased agitation, the particle size of the phenothiazine became increasingly smaller. By the time the agitation became violent, the average phenothiazine particles had a particle size of about 1.9 microns.

Still further reduction in particle size of the phenothiazine can be obtained by a careful determination of the manner in which the Class I solution is introduced into the Class II liquid. As previously noted, when the phenothiazine crystallizes out of solution in the Class II liquid, it floats to the surface. In a short time, the top of the latter liquid is supporting a large number of phenothiazine particles. It has been pointed out that, in order to facilitate crystallization of the phenothiazine particles, it is imperative that the Class I solution be continuously in contact with the Class II liquid; and this, of course, can be facilitated by obtaining almost instantaneous mixing of the two liquids. However, even with instananeous mixing, the desired contact of the two liquids will not be obtained if the Class I solution is poured on top of the Class II liquid while phenothiazine particles are floating on the surface of the latter. In such case, moreover, contact of Class I solution with the phenothiazine particles will cause the latter to grow into crystals of sizes in excess of those which need be obtained. This effect can be avoided and phenothiazine particles of still finer particle size can be obtained by introducing the Class I solution at a sufficient distance below the surface of the Class II liquid so that it will be continuously in contact with the Class II liquid and away from the phenothiazine particles floating on the surface thereof. The point of introduction will vary with the size container in which the Class II liquid is located, of course; in a small container the point may be adjacent the bottom, in a larger one, it may be near the center thereof. The only criterion is that this point must be such that the Class I solution is continuously in contact with the Class II liquid and away from the surface thereof.

Figure 5:
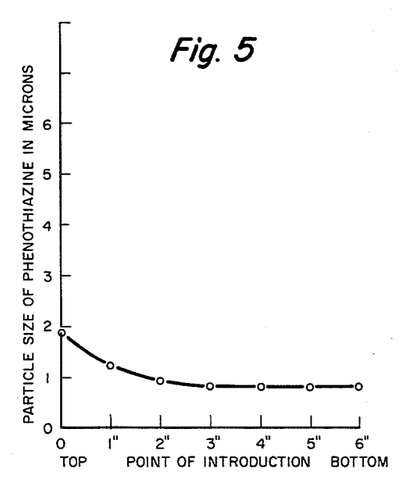

This immediately aforementioned feature of the process is well illustrated in FIGURE 5. Again, 150 grams of phenothiazine were dissolved in 750 cc. of acetone. This solution was introduced at a rate of 2.5 cc. per second at varying depths in 6000 cc. of water maintained at 60° F. The water had a depth of approximately six inches. During the introduction of the acetone solution into the water, the latter was maintained in a state of violent agitation. While the particle size of phenothiazine obtained was 1.8 microns, even when the acetone solution was poured on the surface of the water, it can be seen that, as the point of introduction of the acetone solution in the water was lowered, the average particle size of the phenothiazine was substantially reduced; and this reduction was maintained until the point of introduction of the acetone solution in the water was at a depth of three inches. At this point, the average particle size of the phenothiazine was 0.8 micron, a size which, as far as I am aware, has never been obtained by any other procedure. There was no need to introduce the Class I solution further down into the Class II liquid, since the particle size obtained by introducing the Class I solution into the Class II liquid at depths lower than three inches did not materially affect the particle size of the phenothiazine obtained.

Still further, smaller crystals of phenothiazine can be obtained by removing the phenothiazine particles from the Class II liquid as soon as the same are formed. In so doing, the crystals of phenothiazine can be continuously kept out of the path of the incoming Class I solution. But more important still, the removal of the phenothiazine particles from the Class II liquid inhibits or stops the crystal growth thereof and maintains the same at an extremely low particle size.

During the experimental work carried out in the development of the present invention, an ordinary fine wire strainer was employed to remove the phenothiazine particles from the Class II liquid as the same were formed. Alternatively, a procedure was employed which resulted in the top of the Class II liquid (in its agitated form) coming just to the top of the mixing vessel. As the Class I solution was added to the Class II solution, the added volume was sufficient to cause an overflow. The phenothiazine crystals which were formed, of course, came to the top of the Class II liquid and flowed over with the overflow. The overflow liquor was filtered and the mother liquor continuously returned to the mixing vessel to thereby maintain a constant overflow. In this fashion, phenothiazine crystals were removed from, and near the surface of, the Class II liquid as soon as they were formed and floated to the surface thereof. The only criterion which must be maintained, of course, is to remove the phenothiazine crystals from the Class II liquid as soon as they are formed; and any suitable procedure or apparatus can be employed for such purpose. A centrifuge is ideal for this purpose with the mother liquor being continuously returned to the crystallization zone.

A procedure which is well recommended for commercial practice resides in the use of two tanks connected with a turbine mixer or pipe line mixer. The Class II liquid is maintained in one tank and continuously pumped through the turbine mixer at extremely high velocities. The Class I solution can be added at the mixer; and the crystals, as soon as they are formed, are passed along with the resulting mixture to the second tank, wherein the phenothiazine crystals will float to the surface of the liquid and be continuously removed therefrom; or all the liquor could be centrifuged and returned to the first tank for recycling.

Figure 6:
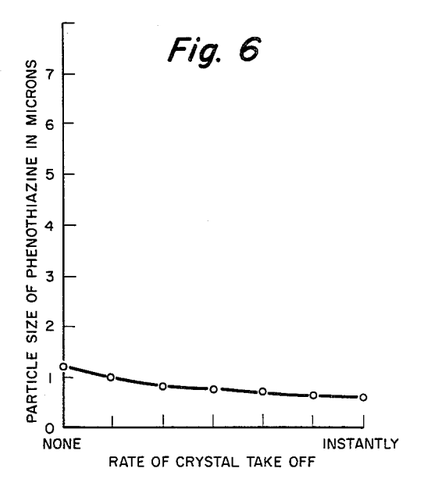

The excellent results obtained by the employment of this expedient is apparent from an inspection of the data graphed in FIGURE 6. In this work, 150 grams of phenothiazine were dissolved in 750 cc. of acetone, and the same introduced at a rate of 2 cc. per second near the bottom of a container holding 6000 cc. of water at a temperature of 60° F. during which the water was violently agitated. The procedure was varied in that runs were made varying from the removal from the water of no phenothiazine crystals to the almost instantaneous removal of phenothiazine crystals therefrom. The data plotted in FIGURE 6 amply demonstrate that, as the rate of phenothiazine removal from the water of Class II solution was accelerated, the particle size of the phenothiazine particle became smaller.

Figure 3:
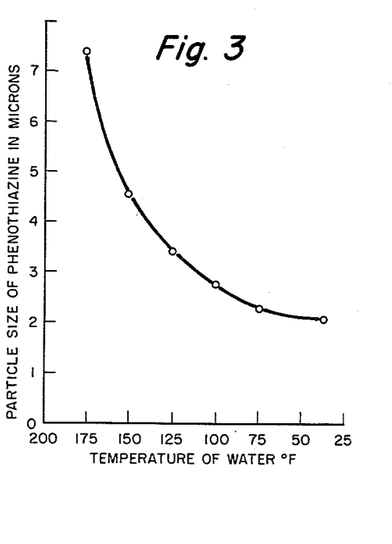
Figure 7:
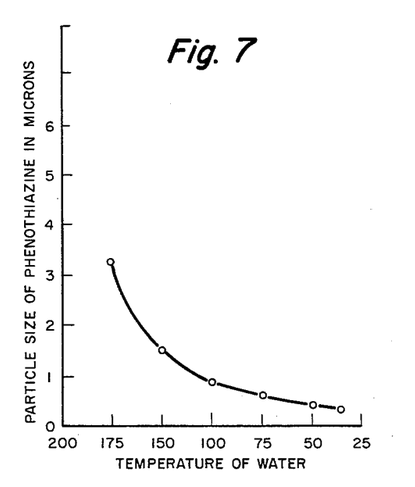

In FIGURE 3, it is demonstrated that, in order to obtain phenothiazine of an extremely small particle size, the temperature of the Class II liquid must be maintained within certain well-defined and critical temperature ranges. According to this figure, 150 grams of phenothiazine was dissolved in 750 cc. of acetone, and the same poured at a rate of 2 cc. per second into 6000 cc. of water maintained at defined temperature levels. No agitation, however, was employed in the example of FIGURE 3; and, in addition, the acetone solution was poured on the surface of the water; and the phenothiazine particles were not removed as they were formed. In obtaining the data illustrated in FIGURE 7, the work resulting in the data of FIGURE 3 was repeated, but, additionally, the acetone solution was introduced near the bottom of the water at a rate of 2 cc. per second. The water was maintained in a state of violent agitation; and the phenothiazine particles were continuously removed from the water as quickly as they were formed. It will be noted from FIGURE 7 that, by employing each of the critical features defined herein, the particle size of the phenothiazine was reduced to a value on the order of 0.4 micron. Best results, as shown in FIGURE 3, were obtained when the temperature of the water was maintained within a temperature range of about 33° F. to about 75° F., although the temperature could, if desired, have been maintained as high as 100° F. or even 150° F.

Figure 8:
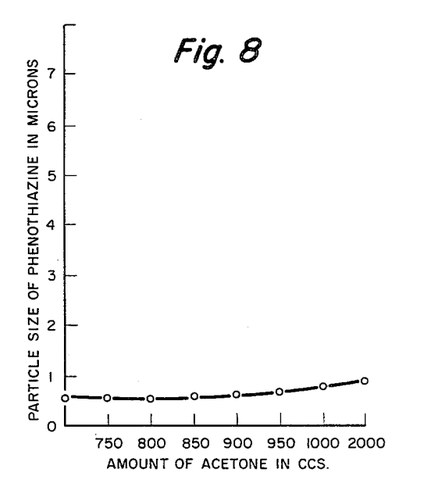

As previously pointed out, it is desirous to employ the Class I liquid in amounts only sufficient to dissolve the phenothiazine available, so that, when the solution is introduced into the Class II liquid, the crystallization of the phenothiazine is facilitated due to the presence of sufficient Class II liquid for this purpose. This is shown in FIGURE 8. In the runs whose data are plotted therein, 150 grams of phenothiazine were dissolved in varying amounts of acetone; and the solution obtained was, in each instance, introduced at a rate of 2 cc. per second into the bottom of a container holding 6000 cc. of water which was maintained in a state of violent agitation and at a temperature of 60° F. As seen, when a saturated solution of acetone in phenothiazine was employed, 150 grams of phenothiazine was dissolved in 750 cc. of acetone, and the minimum particle size of phenothiazine was obtained. As the acetone solution was made more dilute, the particle size of the phenothiazine was increased, although, even with the use of acetone in an amount of 2000 cc., the particle size of the phenothiazine was 0.9 micron. Accordingly, it is most desirable that the Class I solution should be at least about 90 percent saturated.

Figure 9:
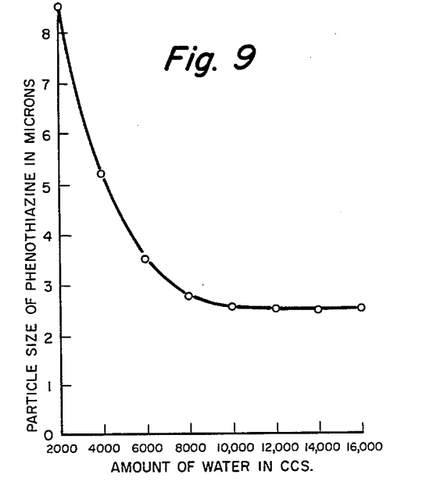

In each of FIGURES 1 through 8, there are illustrated the advantages of operating in accordance with the teachings of the present invention. In each instance, the Class I liquid employed was acetone. In order to further demonstrate the adaptability of the novel process to other systems, additional, and comparable, tests were conducted while using glacial acetic acid as the Class I liquid. In FIGURES 9 through 16, the tests utilized 10 grams of the same phenothiazine as was employed in FIGURES 1 through 8. In FIGURE 9, the phenothiazine was dissolved in 800 cc. of glacial acetic acid, essentially a saturated solution; and the solution obtained was poured at a rate of 5 cc. per second into various quantities of water at 60° F. There was no agitation; and the crystals were not removed as they were formed. The smallest crystal formed under these conditions was 2.6 microns, and this was obtained while using 10,000 cc. of water. Additional quantities of water did not result in a further reduction in crystal size.

Figure 10:
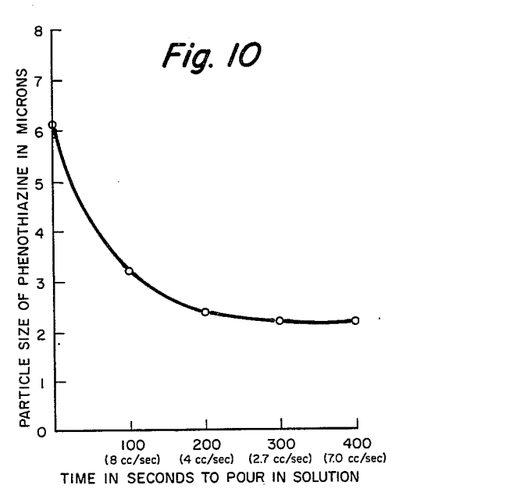

As represented in FIGURE 2, 10 grams of phenothiazine were dissolved in 800 cc. of glacial acetic acid; and the solution was poured at varying rates on top of 10,000 cc. of water maintained at 60° F. The water was not agitated, nor were the crystals removed, until all of the Class I solution had been poured into the Class II liquid. As illustrated in FIGURE 10, when the Class I solution was dumped practically instantaneously in the Class II liquid, the particle size of the phenothiazine was 6.1 microns. Decrease in the rate of introduction of the Class I solution into the Class II liquid resulted in decrease in the particle size of the phenothiazine. This reduction of particle size continued until the rate of introduction of Class I solution was about 3 cc. of glacial acetic acid solution per second or less, at which point phenothiazine of a particle size of about 2.3 was obtained.

Figure 11:
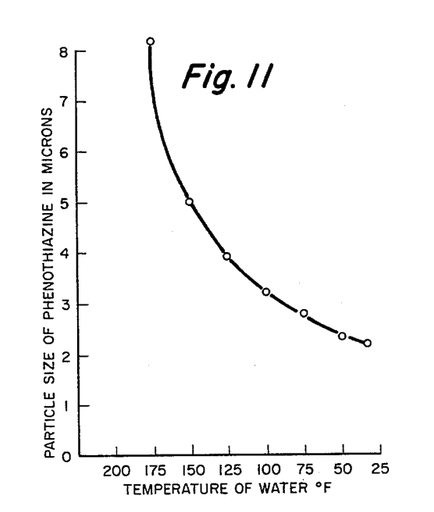

Referring to FIGURE 11, 10 grams of phenothiazine were again dissolved in 800 cc. of glacial acetic acid; and the resulting solution was poured at a rate of 2 cc. per second into 10,000 cc. of water at varying temperatures. There was no agitation and no immediate crystal takeoff. The smallest particle size obtained under these conditions was 2.3 microns at 33° F. As previously demonstrated, best results were obtained when the temperature was maintained between about 33° F. and 75° F.

Figure 12:
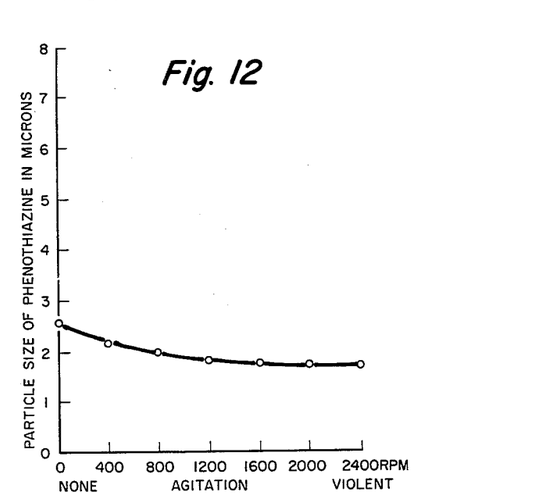

Referring to FIGURE 12, 10 grams of phenothiazine were dissolved in 800 cc. of glacial acetic acid; and the solution obtained was introduced at a rate of 2 cc. per second into 10,000 cc. of water at 60° F. The agitation of the water was varied from zero to violent or, in other words, with a stirrer operating from a standstill gradually up to 2400 r.p.m. From this, it is apparent that, with increased agitation, the particle size of phenothiazine was appreciably reduced from 2.6 to 1.7 microns.

Figure 13:
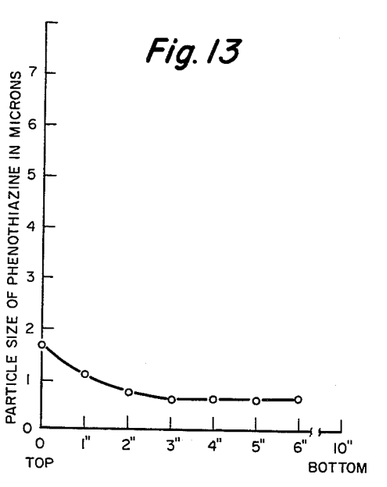

In the showing of FIGURE 13, the conditions were maintained exactly as in FIGURE 12, except that the water was maintained in a state of violent agitation at all times; and the acetic acid solution was introduced at a rate of 2 cc. per second at varying depths in the water. In this manner, the particle size was reduced from 1.7 to 0.7 microns. The minimum particle size was obtained at a depth of three inches from the top of the water, although the acetic acid solution could, if desired, be introduced at lower depths in the water.

Figure 14:
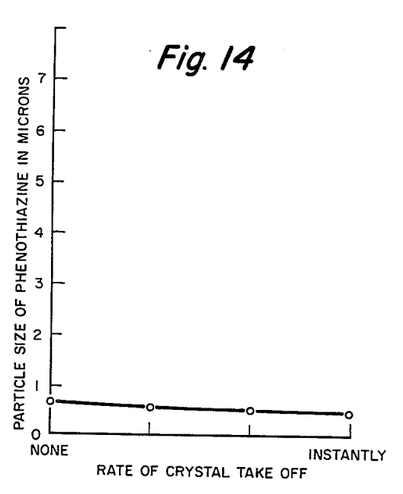

The conditions in FIGURE 14 were the same as in FIGURE 13, except that acetic acid solution was continuously introduced at a rate of 2 cc. per second into the water at a depth of three inches; and the rate of removal of phenothiazine crystals from the water was varied from none to practically instantaneous. In this instance, the phenothiazine particle size varied from 0.7 to 0.5 micron.

Figure 15:
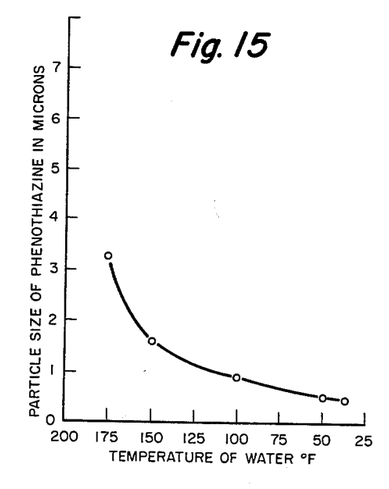

In the showing of FIGURE 15, 10 grams of phenothiazine was dissolved in 800 cc. of glacial acetic acid; and the resulting mixture was poured at a rate of 2 cc. per second into 10,000 cc. of water of varying temperatures, but at a constant depth of six inches from the top and while the water was in a state of violent agitation, the crystals formed being practically instantaneously removed from the surface of the water. In this situation, the particle size of the phenothiazine varied from 3.2 microns at 175° F. to 0.4 micron at 33° F.

Figure 16:
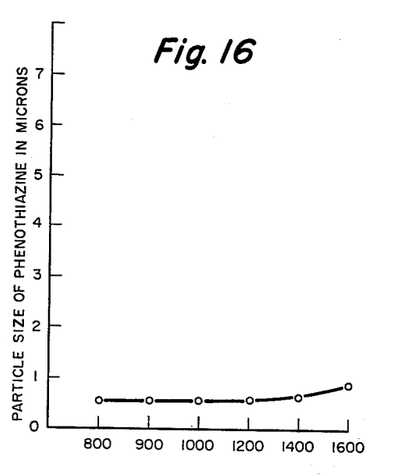

The conditions in FIGURE 16 were the same as in FIGURE 15, except that the water was held at a constant temperature of 60° F. and the amount of glacial acetic acid varied from 800 cc. to 1600 cc. The purpose for so doing was to determine if, by increasing the relative amount of Class I liquid relative to the phenothiazine, a further decrease in particle size of phenothiazine could be effected. It was found that the particle size was somewhat increased from a substantially saturated solution of 0.6 micron to a dilute solution of 0.9 micron.

Figures 17, 18:
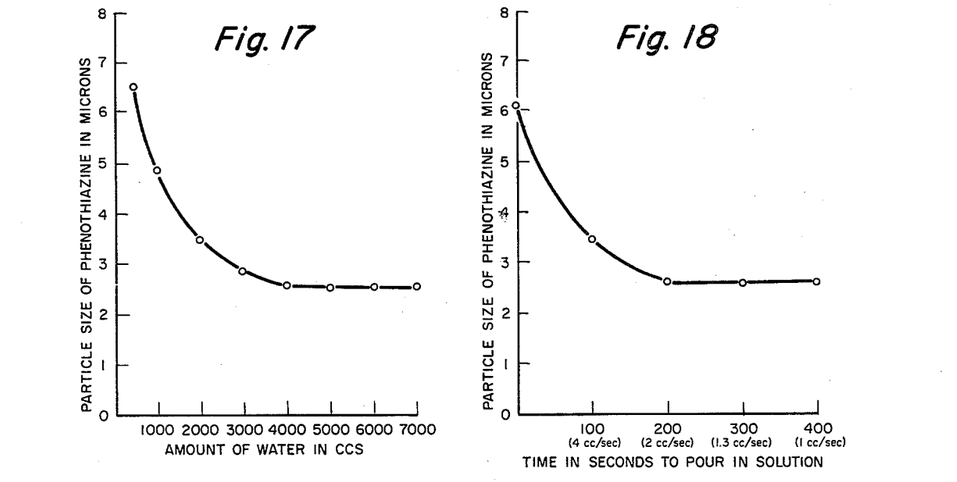

In further tests, I employed ethyl alcohol as the Class I liquid. In FIGURES 17 through 24, the tests were conducted while using 5 grams of the same phenothiazine employed in FIGURES 1 through 16. In FIGURE 17, the phenothiazine was dissolved in 400 cc. of ethyl alcohol (essentially a saturated solution); and the solution obtained was poured at a rate of 2 cc. per second into various amounts of water at 60° F. There was no agitation and crystals were not removed as they were formed. The smallest crystal obtained under these conditions was 2.6 microns and was obtained while using 4000 cc. or more of water.

In the showing of FIGURE 18, 5 grams of phenothiazine were dissolved in 400 cc. of ethyl alcohol; and this solution was introduced into 5000 cc. of 60° F. water at varying rates. The solution was poured on the top of the water with no agitation; and the crystals were not immediately removed. The particle size of the phenothiazine crystals formed varied from 6.1 microns when the solution was dumped practically instantaneously in the water, to 2.6 microns when the rate was 2 cc. per second or less.

Figures 19, 20:
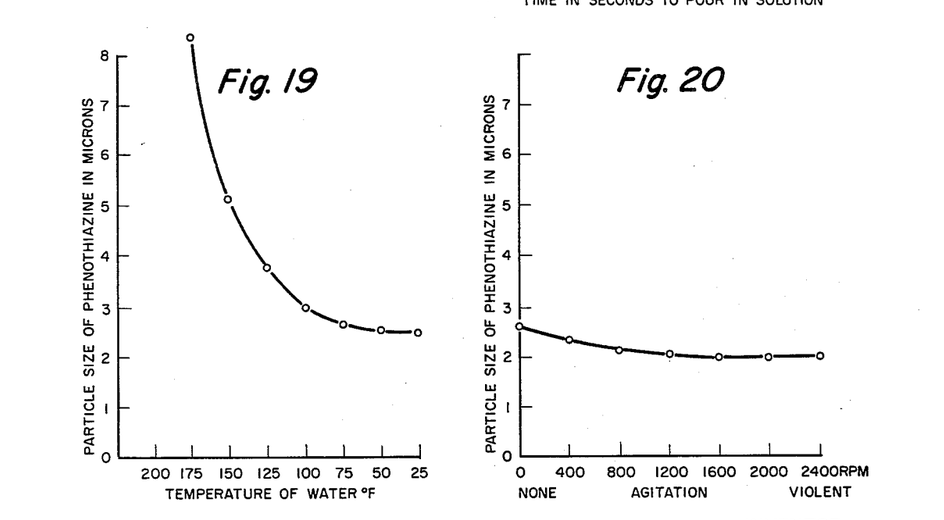

In FIGURE 19, 5 grams of phenothiazine were again dissolved in 400 cc. of ethyl alcohol; and the resulting solution poured into 5000 cc. of water, at varying temperatures, at a rate of 2 cc. per second. There was no agitation and no immediate crystal takeoff. The smallest particle size obtained under these conditions was 2.5 microns at about 33° F.

In FIGURE 20, 5 grams of phenothiazine were dissolved in 400 cc. of ethyl alcohol and poured at a rate of 2 cc. per second into 5000 cc. of 60° F. water. The agitation was varied from none to violent, or, in other words from 0 to 2400 r.p.m. As a result, it was found that, with increased agitation, the particle size of phenothiazine was appreciably reduced from 2.6 to 2.0 microns. There was no immediate crystal takeoff during this particular procedure.

Figure 21:
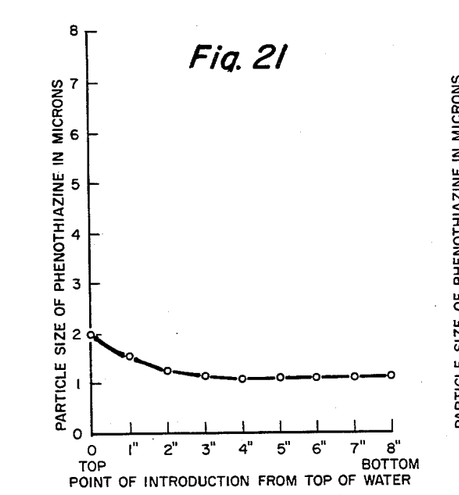

In FIGURE 21, 5 grams of phenothiazine were dissolved in 400 cc. of ethyl alcohol. This solution was introduced at a rate of 2 cc. per second at various depths into the water, which was violently agitated; but there was no immediate crystal takeoff. The particle size was reduced from 2.0 microns at the surface to 1.1 microns at three inches or more below the surface.

Figure 22:
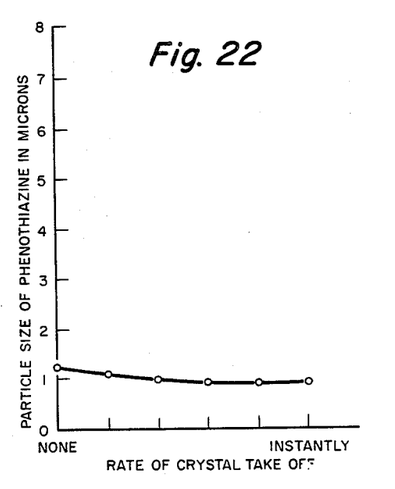

In FIGURE 22, 5 grams of phenothiazine were dissolved in 400 cc. of ethyl alcohol; and this solution was introduced into 5000 cc. of 60° F. water three inches below the surface thereof, at a rate of 2 cc. per second. The agitation was violent; and the rate of removal of the phenothiazine crystals from the water was varied from none to practically instantaneous. In this case, the particle size of the phenothiazine was reduced from 1.2 to 0.8 microns.

Figure 23:
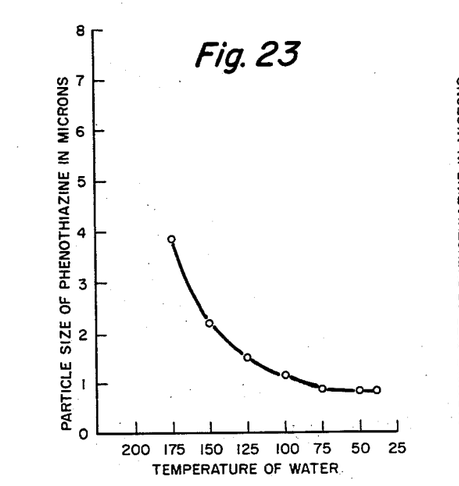

In FIGURE 23, 5 grams of phenothiazine were dissolved in 400 cc. of ethyl alcohol; and this solution was introduced into 5000 cc. of water at varying temperatures at a rate of 2 cc. per second. The agitation was violent and the crystals removed practically as soon as they were formed. In this instance, the particle size of the phenothiazine varied from 3.8 microns at 175° F. to 0.8 at 33° F.

Figure 24:
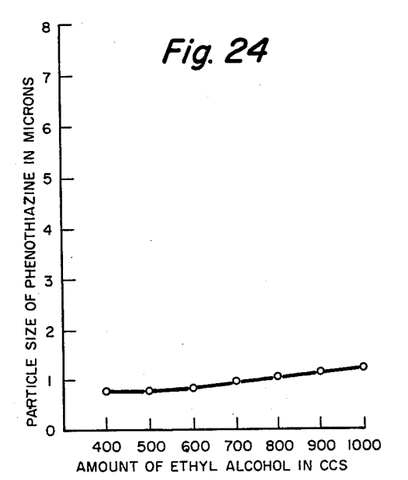

In FIGURE 24, 5 grams of phenothiazine were dissolved in varying amounts of ethyl alcohol ranging from 400 cc. to 1000 cc. These solutions were introduced into 5000 cc. of water at 60° F. three inches below the surface thereof and at a rate of 2 cc. per second. The agitation was violent and the crystals were removed practically as soon as they were formed. The particle size of the phenothiazine crystals formed varied from 0.8 microns (in 400 cc. of ethyl alcohol) to 1.3 microns (in 1000 cc. of ethyl alcohol).

In each of these tests described hereinbefore, the purity of the phenothiazine was not materially improved. However, this can be accomplished immediately after dissolving the phenothiazine in the Class I liquid (and before the solution obtained is poured into the Class II liquid) by filtering the Class I liquid. Since the tarry analogs of phenothiazine are not soluble in the Class I liquid, they are, therefore, removable by said filtration step.

From the following it is manifest that the purity of the phenothiazine can be improved by the method of the present invention. Lump phenothiazine meeting National Formulary Specifications (referred to as phenothiazine NF) and lump purified phenothiazine made in accordance with my United States Patent No. 2,887,482 were treated in substantial conformity with the procedure outlined in the graph of FIGURE 6, the only difference residing in the fact that the phenothiazine-acetone solution initially obtained was filtered before the same was introduced into the water. Table I, which follows shortly hereinafter, illustrates the increase in the purity of both phenothiazine NF and phenothiazine which has been purified in the manner referred to immediately hereinbefore. At the same time, it will be noted that the particle size is materially reduced. The purity of the phenothiazine was determined by molecular distillation.

*Table I*

| Type of Phenothiazine Used | Initial Purity, Percent | Purity After Treatment, Percent | Particle Size After Treatment |
|---|---|---|---|
| Phenothiazine NF | 90.8 | 94.3 | 0.6 |
| Do | 91.1 | 94.7 | 0.7 |
| Do | 90.4 | 95.2 | 0.6 |
| Purified | 99.8 | 100.0 | 0.9 |
| Do | 99.9 | 100.0 | 0.9 |
| Do | 99.8 | 100.0 | 0.7 |

From the above, it is believed apparent that phenothiazine of an extremely small particle size can be obtained from phenothiazine of a relatively large size by the relatively simple procedure of dissolving the phenothiazine of large size in Class I liquid, and thereafter pouring the solution obtained into a Class II liquid; the result being that the phenothiazine crystallizes in the Class II liquid as small particles which are thereafter recovered. The particle size of the phenothiazine thus obtained is relatively small, but can be made much smaller by additionally following one or more of the following steps:

(1) Using at least about two volumes of Class II liquid per volume of Class I liquid;
(2) Employing as close as possible a saturated solution of Class I liquid when the same is introduced into the Class II liquid;
(3) Carefully controlling the temperature of the Class II liquid when the Class I solution is poured therein;
(4) Violently agitating the Class II liquid when the Class I solution is poured therein;
(5) Introducing the Class I solution at a point or points below the surface of the Class II liquid;
(6) Removal of the phenothiazine crystals from the Class II liquid as soon as the crystals appear therein;
(7) Introducing the Class I solution at a selected rate in the Class II liquid; etc.

Therefore, by following the procedures employed herein, I am able to produce phenothiazine heretofore unobtainable by any process having a particle size of any desired size, but particularly in a range of about 0.3 to about 1.4 microns, and without any appreciable increase in cost over the procedures of the prior art.

As has been mentioned earlier herein, many tests conducted by the industry have proved that, as the average particle size of the phenothiazine is reduced, the anthelmintic efficiency thereof is correspondingly increased. So effective is the phenothiazine of relatively small particle size that I have found that, while the anthelmintic efficiency thereof is increased, the amount of phenothiazine required to obtain such results is decreased. This, of course, means substantially reduced cost in effectively administering to livestock and poultry, etc., the phenothiazine particles which are obtained by the process of the present invention.

As understood by those skilled in the art, animals, and particularly cattle, have an intense dislike of the characteristic taste and odor of phenothiazine; and it is, therefore, generally difficult to administer the same to them. In many instances, the full therapeutic dose of phenothiazine is given to animals in their feed. By appreciably reducing the amount of phenothiazine necessary to effect a full therapeutic dose, the method of the present invention results in the animal being more willing to consume the mixture of feed and phenothiazine.

With respect to purity and particle size of phenothiazine, experimental work has shown that phenothiazine having a purity of at least 99.8 percent and an average particle size of about six to seven microns is extremely effective in removing internal parasites from sheep. In cattle, the same phenothiazine is not as effective. Thus, tests have shown that such phenothiazine will remove approximately 70 percent of the internal parasites from cattle. An anthelmintic, when administered to cattle, is considered effective when at least about 90 percent of the internal parasites are removed from the host animal. Tests have shown that phenothiazine having a purity of 99.8 percent and an average particle size of about two to three microns is effective in removing from 90 to 99 percent of the internal parasites from the cattle. I have discovered that phenothiazine having a purity of about 100 percent and an average particle size of about 0.3 to about 1.4 microns will remove internal parasites from livestock and poultry two or three times as efficiently as phenothiazine of about the same purity but having an average particle size of from about two to three microns.

The following is presented as further proof of effectiveness of the method of the present invention:

Phenothiazine produced in accordance with my U.S. Patent No. 2,887,482 and having a freezing point of 184.7° C. was treated in accordance with the procedure represented in the graph of FIGURE 6, except for the fact that the acetone solution initially obtained was filtered before the same was introduced into the water. The phenothiazine thus obtained had an average particle size of about 0.9 micron and a freezing point of 185.1° C.

required when using phenothiazine which has been prepared by the procedures of the prior art. With sheep weighing over 50 pounds, a full therapeutic dose of phenothiazine prepared in accordance with the process of the present invention consists of about five grams, which is approximately one-fifth of the full therapeutic dose which is required when utilizing the phenothiazine of the prior art.

Further illustration of the effectiveness of the phenothiazine which has been prepared in accordance with the teachings of the present invention is represented by the following tabulated data.

*Table II*

TESTS SHOWING THE ANTHELMINTIC EFFICIENCY OF THE PHENOTHIAZINE PREPARED BY THE METHODS DESCRIBED HEREIN

| Test | Type of Animal | Weight | Amont of Phenothiazine Given, grams | Parasites in Animal Expressed in Eggs per Gram of Feces | | | Percent Efficiency | Method of Preparing the Phenothiazine Used and its Physical Properties |
|---|---|---|---|---|---|---|---|---|
| | | | | The Day before administering Phenothiazine | 7 Days after administering Phenothiazine | 14 Days after administering Phenothiazine | | |
| 1 | Cattle | 385 | 30 | 630 | 40 | 25 | 96 | Purified phenothiazine was dissolved in acetone as per Figure 6. This phenothiazine had a freezing point of 185.1° C. and an average particle size of 0.9 micron. |
| 2 | do | 397 | 30 | 580 | 35 | 20 | 94 | |
| 3 | Sheep | 61 | 10 | 1,260 | 60 | 25 | 98 | |
| 4 | do | 57 | 10 | 840 | 50 | 25 | 97 | |
| 5 | Cattle | 412 | 30 | 473 | 65 | 35 | 92 | Purified phenothiazine was dissolved in Glacial acetic acid as per Figure 14. This phenothiazine had a freezing point of 185.0° C. and an average particle size of 0.8 micron. |
| 6 | do | 427 | 30 | 494 | 30 | 25 | 95 | |
| 7 | Sheep | 76 | 10 | 965 | 35 | 10 | 99 | |
| 8 | do | 64 | 10 | 934 | 30 | 35 | 96 | |
| 9 | Cattle | 392 | 30 | 565 | 55 | 35 | 93 | Purified phenothiazine was dissolved in ethyl alcohol as per Figure 22. This phenothiazine had a freezing point of 185.1° C. and an average particle size of 1.1 microns. |
| 10 | do | 387 | 30 | 476 | 40 | 40 | 91 | |
| 11 | Sheep | 68 | 10 | 764 | 20 | 35 | 95 | |
| 12 | do | 74 | 10 | 546 | 0 | 10 | 98 | |
| 13 | Cattle | 490 | 30 | 430 | 0 | 35 | 91 | Purified phenothiazine was dissolved in acetone as per Figure 6. This phenothiazine had a freezing point of 185.1° C. and an average particle size of 1.3 microns. |
| 14 | do | 410 | 30 | 490 | 35 | 35 | 93 | |
| 15 | Sheep | 58 | 10 | 840 | 0 | 30 | 96 | |
| 16 | do | 64 | 10 | 1,060 | 60 | 30 | 97 | | which represents a purity of 100 percent. This phenothiazine was then administered to sheep. Previous tests showed that, with phenothiazine of an average particle size of about six microns and a freezing point of 184.7° C., a 25-gram dose was required to remove approximately 95 percent of internal parasites from sheep weighing 60 pounds. Using the phenothiazine prepared in the manner described immediately hereinbefore (that is, of a freezing point of 185.1° C. and an average particle size of about 0.9 micron) a dosage of about 8 grams was sufficient to obtain the removal of approximately 94 percent of the internal parasites from sheep weighing 64 pounds. In effect, approximately one-third of the finer phenothiazine is as effective in this context as the phenothiazine of larger particle size. Similar tests have shown that a 30-gram dose of phenothiazine of an average particle size of about 0.9 micron, and having a freezing point of 185.1° C., removed about 96 percent of the internal parasites from cattle weighing approximately 425 pounds. A dosage of 75 grams of phenothiazine having a freezing point of 184.7° C., and an average particle size of six microns, was required to remove 97 percent of the internal parasites from cattle averaging 405 pounds. Thus, I have found that, when phenothiazine having an average particle size of about 1.4 microns or less is administered to cattle to deworm the same, about 90 to 99 percent of the worms can be removed by using about five grams per 100 pounds of body weight. This is about ¼ to about ½ of the amount From the immediate foregoing, it will be observed that eight cattle were treated with but one-half of the conventional full (60 grams) therapeutic dose of phenothiazine, and yet the anthelmintic efficiency thereof ranged from 91 percent to 96 percent. Similarly, eight sheep were treated with 10 grams of phenothiazine; and the anthelmintic efficiency thereof ranged from 95 to 99 percent, whereas 25 grams of ordinary phenothiazine would be required to obtain the same anthelmintic efficiency.

Since it is obvious that many changes and modifications can be made in the above-described details without departing from the nature and spirit of the invention, it is to be understood that the invention is not to be limited thereto except as set forth in the appended claims.

I claim:

1. A process for consistently obtaining phenothiazine of substantially uniform particle size averaging materially less than 4 microns, said process comprising combining phenothiazine with a solvent therefor which is miscible with water; filtering any undissolved foreign materials from the solvent and dissolved phenothiazine; recovering the filtrate; introducing the filtrate into a body of water whose temperature is within the range of approximately 33° F. to approximately 150° F. and whose volume is at least twice as great; agitating the said body of water while said filtrate is being introduced thereto; and quickly recovering the resulting crystals from said body of water, thereby obtaining phenothiazine particles of an average size of not materially greater than approximately 3.5 microns.

2. A process in accordance with claim 1 wherein the solvent is acetone.

References Cited in the file of this patent

UNITED STATES PATENTS

| | | |
|---|---|---|
| 2,217,566 | Smith | Oct. 8, 1940 |
| 2,415,363 | Mitchell et al. | Feb. 4, 1947 |

FOREIGN PATENTS

| | | |
|---|---|---|
| 741,756 | Great Britain | Dec. 14, 1955 |

OTHER REFERENCES

Pennie: The Canadian Journal of Chemical Engineering, vol. 36, No. 1, pages 78 to 81 (1958).

Chemical Abstracts, vol. 35, col. 5253 (1941) (abstract of Lannung).

Lannung: Arch. Pharm. Chemi., vol. 48, pages 141–52 (1941).

The Merck Index, 6th Ed., page 741, Merck and Co., Rahway, N.J. (1952).

Beeler Bulletin Nat'l. Formulary Committee, vol. 10, No. 4, pages 84–85 and 88 to 91 (1942).